US006781116B2

(12) United States Patent
Bateman

(10) Patent No.: US 6,781,116 B2
(45) Date of Patent: Aug. 24, 2004

(54) MASS SPECTROMETER

(75) Inventor: Robert Harold Bateman, Cheshire, WA (US)

(73) Assignee: Micromass UK Limited, Manchester (GB)

(*) Notice: Subject to any disclaimer, the term of this patent is extended or adjusted under 35 U.S.C. 154(b) by 0 days.

(21) Appl. No.: 10/200,440

(22) Filed: Jul. 23, 2002

(65) Prior Publication Data

US 2004/0016877 A1 Jan. 29, 2004

(51) Int. Cl.[7] ........................................ B01D 59/44

(52) U.S. Cl. ........................................ 250/281

(58) Field of Search ........................................ 250/288, 281, 250/282, 309, 292

(56) References Cited

U.S. PATENT DOCUMENTS

| | | | | | |
|---|---|---|---|---|---|
| 4,135,898 | A | * | 1/1979 | Rosengard | 55/419 |
| 4,285,701 | A | | 8/1981 | Schlenker | |
| 4,292,058 | A | * | 9/1981 | Willeitner | 55/348 |
| 4,458,148 | A | | 7/1984 | Hirshfield et al. | |
| 4,842,738 | A | | 6/1989 | Greenspan | |
| 5,428,220 | A | * | 6/1995 | Ehara | 250/281 |
| 5,931,986 | A | * | 8/1999 | Peurrung et al. | 95/28 |
| 6,177,669 | B1 | | 1/2001 | Wells et al. | |
| 6,217,776 | B1 | | 4/2001 | Ohkawa | |
| 6,248,240 | B1 | | 6/2001 | Ohkawa | |
| 6,251,282 | B1 | | 6/2001 | Putvinski et al. | |
| 6,293,406 | B1 | | 9/2001 | Miller et al. | |
| 2002/0020657 | A1 | | 2/2002 | Miller et al. | |

FOREIGN PATENT DOCUMENTS

| | | | | | |
|---|---|---|---|---|---|
| EP | 1001450 | | | 5/2000 | |
| GB | 2005164 | A | | 10/1977 | |
| GB | 2369722 | A | * | 6/2002 | H01J/49/06 |
| GB | 2369926 | A | * | 6/2002 | H01J/49/26 |
| RU | 2064205 | | | 7/1996 | |
| WO | 98/36822 | | | 8/1998 | |
| WO | WO 00/19484 | | | 4/2000 | |

OTHER PUBLICATIONS

James, et al., "Isotope Separation In The Plasma Centrifuge", Plasma Physics, vol. 18, pp. 289–300.

Greenspan et al., "A Note on Flow and Separation In a Centrifugal Spectrometer", Separation Science and Technology, 32(16), pp. 2715–2722, 1997.

Wijnakker et al., "Limitations on Mas Separation by the Weakly Ionized Plasma Centrifuge", Z. Naturforsch, 35a, pp. 883–893, 1980.

Ikehata et al., "Centrifugal Mass Separation in Rotating Plasma Produced By a Coaxial Plasma Gun", Applied Physics Letters, 55 (13), pp. 1289–1291, 1989.

Krishnan et al., "Plasma Centrifuge", Physical Review Letters, vol. 46, No. 1, pp. 36–39, 1981.

(List continued on next page.)

*Primary Examiner*—John R. Lee
*Assistant Examiner*—Johnnie L Smith, II
(74) *Attorney, Agent, or Firm*—Diederiks & Whitelaw PLC

(57) ABSTRACT

A mass spectrometer is disclosed comprising a vortex mass filter/analyser. The vortex mass filter/analyser preferably comprises a chamber with a central rotatable shaft connected to a pressure reducing means. As the shaft rotates, a vortex is created within the chamber. The centrifugal force on an ion in the vortex is arranged to be balanced at a certain radius of rotation within the chamber by the electric force due to an opposed radial electric field. Ions having a certain mass to charge ratio are arranged to be maintained at a stable equilibrium at this radius and can then be selectively removed for further analysis. With this arrangement, no magnetic field is required and the apparatus can operate at pressures around that of atmospheric pressure.

19 Claims, 5 Drawing Sheets

OTHER PUBLICATIONS

Linderstrom–Lang, "Effect of Operating Conditions, Physical Size and Fluid Characteristics on the Gas Separation Performance of a Linderstrom–Lang Vortex Tube", International Journal of Mass Transfer, vol. 20, pp. 577–579, 1977.

Aisen et al., "Study of Isotope Separation of Some Chemical Elements in a Gas Centrifuge", Nuclear Instruments and Methods in Physics Research, vol. 374, pp. 127–131, 1996.

Grossman et al., "Plasma Isotope Separation Methods", IEEE Transactions on Plasma Science, vol. 19, No. 6, pp. 1114–1122, 1991.

Greenspan et al., "A Centrifugal Spectrometer", American Society for Mechanical Engineering, vol. 21, pp. 5–7, 1991.

* cited by examiner

MASS SPECTROMETER

BACKGROUND OF THE INVENTION

1. Field of the Invention

The present invention relates to a mass spectrometer.

2. Discussion of the Prior Art

Conventionally, mass spectrometers utilize an ion optical mass filter/analyser such as a quadrupole. However, ion optical devices must normally be operated at low pressures (high vacuum) which requires the use of expensive vacuum pumps and related equipment.

EP-1001450 discloses a centrifugal mass filter for separating low and high mass ions. Crossed electric and magnetic fields are provided which act upon ions within a chamber. The crossed fields cause ions to move through the chamber on helical paths about a central axis. The electric, magnetic and centrifugal forces acting upon the ions are arranged so that ions having a mass to charge ratio greater than a cut-off value have unconfined (loss) orbits. Such ions move radially outward until they strike the wall of the chamber. Lighter ions however, will be contained within the chamber and can be collected at the exit of the device. There is no teaching or suggestion that the mass filter is suitable for operation at relatively high pressures, and indeed the assumption in the art is that mass filters must be operated at low pressures e.g. $<10^{-3}$ mbar.

SUMMARY OF THE INVENTION

It is desired to provide an improved mass spectrometer. A significant advantage of the preferred mass filter/analyser over conventional ion optical mass filters/analysers and the mass filter disclosed in EP-1001450 is that the preferred mass filter/analyser is intended to be operated at much higher pressures than is known in the art, up to and even above atmospheric pressure. The preferred mass filter/analyser therefore represents a significant advance in the art.

In contrast to the centrifugal mass filter disclosed in EP-1001450, the preferred embodiment relates to a vortex mass filter/analyser. In a centrifuge the tangential velocity of a particle in the rotating fluid increases with radius, whereas in a vortex the tangential velocity of a particle in the rotating fluid decreases with radius.

According to a particularly preferred embodiment, the vortex mass filter/analyser may operate as a mass analyser. The term “mass analyser” is used in the present application to describe a mass to charge ratio selective device which has a high mass to charge ratio resolution $(m/z)/\Delta(m/z)$. For example, the mass to charge ratio resolution $(m/z)/\Delta(m/z)$ of the mass analyser according to the preferred embodiment may be 500:1 or more (i.e. it can select ions to within one mass to charge ratio unit over a range of 500 mass to charge ratio units). For reference, a conventional quadrupole mass analyser may, in certain circumstances, be considered to have a comparable mass to charge ratio resolution of up to 5000:1.

The term “mass filter” is intended to describe a mass to charge ratio selective device which operates either in a low-pass, broad band-pass or high-pass mode, and typically but not necessarily always has a relatively low mass resolution. For example, a low pass mass filter such as is disclosed in EP-1001450 which transmits ions having a mass to charge ratio <100 mass to charge ratio units could be considered to have a mass to charge ratio resolution $(m/z)/\Delta(m/z)$ of 100:100. The mass filter disclosed in EP-1001450 is not therefore intended to constitute a “mass analyser” within the meaning of the present application.

Mass separators are known which separate particles on the basis of their mass rather than mass to charge ratio. Such mass separators are not intended to constitute a “mass filter” or a “mass analyser” within the meaning of the present application.

A further distinction of the preferred embodiment over the arrangement disclosed in EP-1001450 is that a magnetic field is not required and is therefore preferably not used. The preferred embodiment is therefore much simpler than the mass filter disclosed in EP-1001450.

Preferably, the vortex mass analyser comprises a chamber having a sample inlet and a hollow rotatable shaft arranged within the chamber, the interior of the shaft being in fluid communication with the chamber, wherein the interior of the shaft is connected to a pressure reducing means so that in use a vortex is created within the chamber, and wherein in use a potential difference is maintained between the wall of the chamber and the shaft.

Preferably, the shaft comprises one or more holes or apertures.

Preferably, the pressure reducing means comprises a pump.

Preferably, the potential difference is capable of being varied so that particles having a certain mass to charge ratio are arranged to be in equilibrium at a desired radius in the chamber.

Preferably, the chamber further comprises an inlet for a drying gas.

Preferably, the sample inlet and/or the inlet for a drying gas are arranged so as to generally or substantially tangentially inject a sample and/or drying gas into the chamber.

Preferably, the chamber comprises an outlet through which, in use, ions are extracted.

Preferably, ions having substantially similar mass to charge ratios are preferentially extracted from the chamber via the outlet.

Preferably, the mass spectrometer further comprises an ion source selected from the group comprising: (i) an Atmospheric Pressure Chemical Ionisation (“APCI”) ion source; (ii) an electrospray ion source; and (iii) a Matrix Assisted Laser Desorption Ionisation (“MALDI”) ion source. The MALDI ion source is preferably operated at or around atmospheric pressure. Alternatively, other atmospheric pressure ion sources may be used.

Preferably, the mass analyser comprises a chamber and ions are generated: (i) in the chamber; or (ii) externally to the chamber.

Preferably, the mass analyser is arranged and adapted to be operated at a pressure selected from the group consisting of: (i)$\geqq$1 mbar; (ii)$\geqq$2 mbar; (iii) $\geqq$5 mbar; (iv)$\geqq$10 mbar; (v)$\geqq$20 mbar; (vi)$\geqq$50 mbar; (vii)$\geqq$100 mbar; (viii)$\geqq$150 mbar; (ix)$\geqq$200 mbar; (x)$\geqq$250 mbar; (xi)$\geqq$300 mbar; (xii) $\geqq$350 mbar; (xiii)$\geqq$400 mbar; (xiv)$\geqq$450 mbar; (xv)$\geqq$500 mbar; (xvi)$\geqq$550 mbar; (xvii)$\geqq$600 mbar; (xviii)$\geqq$650 mbar; (xix)$\geqq$700 mbar; (xx)$\geqq$750 mbar; (xxi)$\geqq$800 mbar; (xxii)$\geqq$850 mbar; (xxiii)$\geqq$900 mbar; (xxiv)$\geqq$950 mbar; (xxv)$\geqq$1000 mbar; (xxvi) approximately atmospheric pressure; and (xxvii) above atmospheric pressure.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENTS

Figure 1:
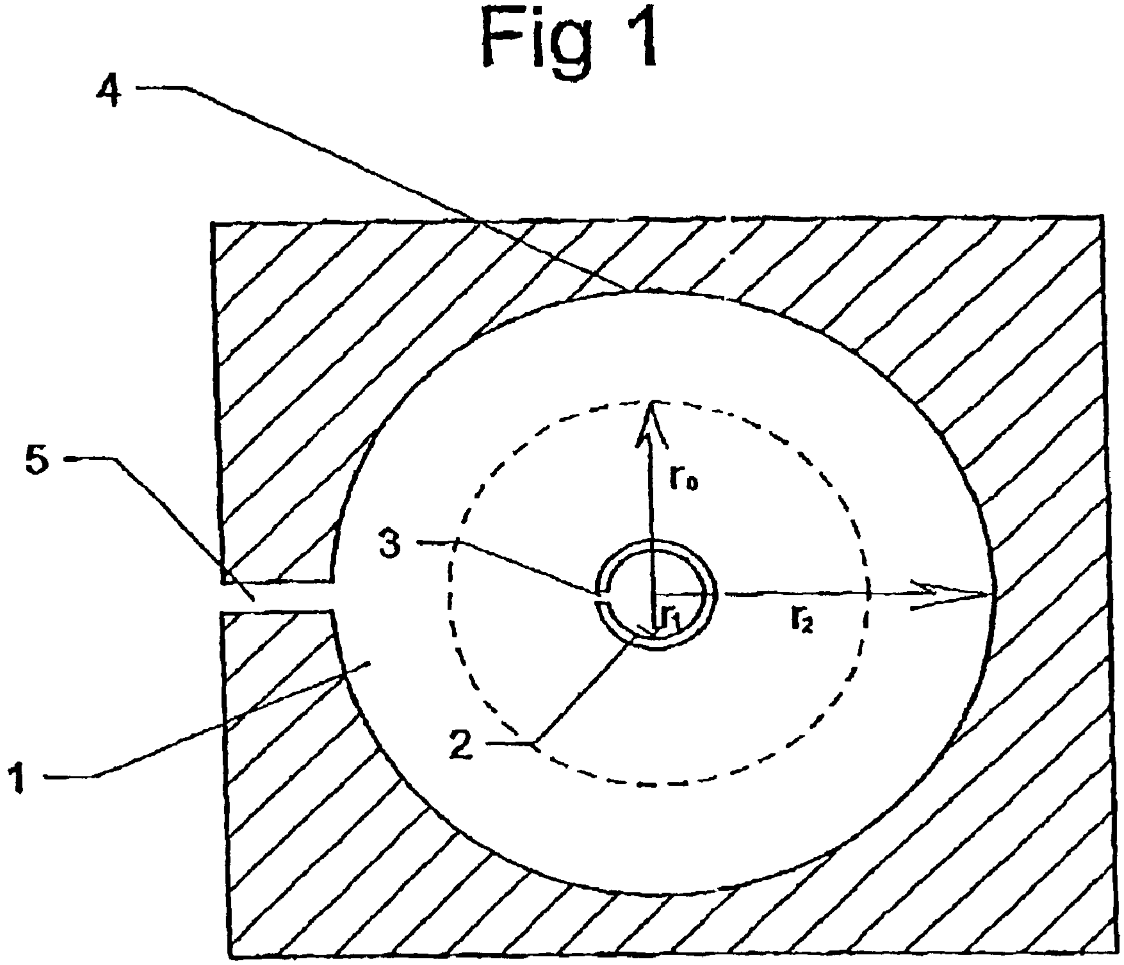
FIG. 1 shows a vortex mass filter/analyser according to a preferred embodiment of the present invention.

A vortex mass filter/analyser according to a preferred embodiment will now be described. As shown in FIG. 1, a preferably cylindrical chamber 1 is provided which preferably has a length at least as great as its diameter. At the centre of the chamber 1 is a generally or at least partially hollow central shaft or tube 2 which is rotatable about a central axis. The central axis of the shaft 2 is preferably parallel with and further preferably coaxial with the central axis of the chamber 1.

Preferably, the central shaft 2 is rotated at a relatively high frequency. Turbomolecular pumps are commonly designed to run at 1000 or 1500 Hz (the rotational frequency being limited by the centripetal force on the blade tips). However, in the preferred embodiment the shaft 2 is not provided with any blade tips and hence the shaft 2 in the preferred embodiment is rotated at a higher frequency of approximately 2000 Hz or higher.

The shaft 2 has one or more holes 3, apertures or other means for communicating fluid in its wall, preferably located towards the base of the shaft 2 which is preferably also towards the base of the chamber 1. Fluid is free to flow from the chamber 1 through the hole(s) 3 and enter the inside of the shaft 2. From there, fluid may exit the chamber 1 by flowing along and within the shaft 2, preferably close to the central axis of the shaft 2.

The end of the shaft 2 distal to the end having the hole(s) 3 may be connected to a vacuum pump (not shown) or other means for reducing the pressure within the shaft 2 relative to the pressure in the chamber 1. The end of the shaft 2 proximal to the hole(s) 3 is preferably blanked off or may in a less preferred embodiment be connected to another or the same vacuum pump (or another or the same pressure reducing means). The chamber 1 preferably includes a fluid inlet 5 in wall 4 of the chamber 1 which allows fluid to flow into the chamber 1. The fluid is preferably a gas or gas/vapour mixture which in the preferred embodiment enters the chamber 1 from an outer region at around atmospheric pressure. However, in other embodiments the fluid may be at a pressure lower (or higher) than atmospheric pressure. In less preferred embodiments the fluid may be a liquid or liquid solution. Ions do not necessarily have to be generated outside the chamber 1, and according to less preferred embodiments ions may be generated within the chamber 1.

As will be explained in more detail below, a vortex is created within the chamber 1 due to the effect of the rotating central shaft or tube 2 which is aspirated whilst it is being rotated. The centrifugal force associated with the vortex causes heavier ions to move radially outwards towards the wall 4 of the chamber 1.

In order to act as a mass filter/analyser, a radially inward electric field is created by maintaining a potential difference between the wall of the chamber 4 and the central shaft 2. The wall 4 of the chamber 1 is preferably maintained at ground (0 V) and the central shaft 2 is preferably maintained at −5 V. The effect of the radial electric field is to urge positive ions back towards the centre of the chamber 1. By arranging the electric force to be in an opposed direction to the centrifugal force, it is possible to arrange for the two forces to cancel one another out at a particular radius for positive ions of a given mass to charge ratio.

By varying the magnitude of the electric force by varying the applied potential difference between the wall 4 of the chamber 1 and the central shaft 2, ions of a desired mass to charge ratio can be arranged to be in equilibrium at a certain radius $r_0$ within the chamber 1. These ions can then be extracted from the chamber 1 either through inlet 5 in the wall 4 of the chamber 1 or through other means (not shown) such as an aperture in an end wall of the chamber 1 at radius $r_0$.

The applied potential difference may be kept constant during an experimental run so that the mass filter/analyser operates in a selected ion monitoring mode. Alternatively, the mass filter/analyser may be operated in a scanning mode so that the potential difference is scanned during an experimental run so that ions of different mass to charge ratios can be sequentially selected and extracted. This mode of operation enables a partial or full mass spectrum to be produced.

The theory underlying the operation of the vortex mass filter/analyser will now be explained in more detail. In a vortex the tangential velocity v (mm/sec) of the fluid at a radius r (mm) from the eye or centre of the vortex is such that:

$$v(r) \propto 1/r$$

i.e. the tangential velocity is inversely proportional to the radius r. The angular velocity ω (radians/sec) is given by:

$$\omega(r)=v(r)/r$$

and hence the angular velocity ω is inversely proportional to the square of the radius.

The centrifugal force $F_c$ on an ion of mass m at a radius r is given by:

$$F_c=mr\omega(r)^2$$

and hence is proportional to $m/r^3$.

If the central rotating shaft 2 has an outer radius $r_1$ and a rotational frequency $f_1$ then the central rotating shaft will have a tangential velocity of:

$$v_1=2\pi f_1 r_1$$

Hence, in the vicinity of the rotating shaft the fluid tangential velocity v at a radius r is given by:

$$v=2\pi f_1 r_1^2/r$$

and the fluid angular velocity ω is given by:

$$\omega=2\pi f_1 r_1^2/r^2$$

Accordingly, the centrifugal force $F_c$ at a radial distance r is given by:

$$F_c=m(2\pi f_1 r_1^2)^2/r^3$$

If chamber 1 has an internal radius $r_2$ then the electric field E in the region between the shaft 2 and the chamber wall 4 at some radius r will be given by:

$$E=\Delta V/(r.\ln(r_2/r_1))$$

where ΔV is the potential difference between the shaft 2 and the wall 4 of the chamber 1.

The electric force $F_e$ due to the effect of the electric field E on an ion with charge ze is given by:

$$F_e=-zeE=-ze\Delta V/(r.\ln(r_2/r_1))$$

and is therefore proportional to −ze/r. The electric force $F_e$ attracts positive ions towards the central shaft 2, and is therefore in the opposite direction to that of the centrifugal force $F_c$.

The net force F on a positive ion with mass m and charge ze is therefore given by:

$$F=F_c+F_e=m.(2\pi f_1 r_1^2)^2/r^3-ze.\Delta V/(r.\ln(r_2/r_1))$$

If at an intermediate radius $r=r_0$, the combined force F is zero, then the mass/charge ratio is such that:

$$m/ze=(\Delta V.r_0^2)/((2\pi f_1 r_1^2)^2.\ln(r_2/r_1))$$

If an ion of mass to charge ratio m/ze moves outwards to a greater distance than $r_0$ from the centre, then the centrifugal force (which is proportional to $m/r^3$) will decrease more rapidly than the electric force due to the electric field (which is proportional to ze/r), and the resulting force will act to move the ion back towards the centre. Conversely, if the same ion moves inwards to a smaller radial distance than $r_0$ then the centrifugal force will increase more rapidly than the electric force due to the electric field, and the resulting force will act to move the ion back away from the centre. The point of equilibrium at radius $r_0$ is therefore a stable equilibrium.

Accordingly, ions having a mass to charge ratio m/ze will migrate to a stable radius $r_0$ where $m/ze \propto \Delta V.r_0^2$. Ions can therefore be separated according to their mass to charge ratio since ions having different mass to charge ratios will achieve stable equilibrium at different radii within the chamber 1.

According to one embodiment, ions exiting the mass filter/analyser chamber may be sampled and detected with an electrode or alternatively they may be sampled by a second mass analyser of conventional design e.g. a quadrupole, magnetic sector, ion trap, time of flight mass analyser etc. or a second vortex mass filter/analyser. In such an arrangement the (first) vortex mass filter/analyser acts as a mass filter before mass analysis. The vortex mass filter/analyser may also be used to separate and select a narrow range of ions for subsequent fragmentation and mass analysis of the products by sampling the ions with a second mass analyser (either of conventional design or a second vortex mass analyser).

The vortex mass filter/analyser may be used to separate ions of different mass to charge ratios as described above and then all the ions other than those with the required mass to charge ratio could be ejected. This may be achieved by reducing the voltage differential between the wall 4 and the shaft 2 and allowing ions with higher mass to charge ratios to be lost to the chamber wall 4 and then increasing the voltage differential and allowing ions with lower mass to charge ratios to be lost to the inner rotating shaft 2 or pumped away through the inner shaft 2.

Ions remaining within the chamber 1 may be fragmented by exciting them by e.g. microwave, infra red, visible or UV radiation, mechanical oscillation and heating induced by the application of an AC electrical voltage to the DC voltage, or heating by ultrasonic mechanical oscillations etc. The resulting daughter ions can then be separated and analysed. Alternatively, particular daughter ions may be isolated and subjected to further excitation such as to produce a second generation of daughter ions for analysis. This process may be repeated as many times as is required.

Ions within chamber 1 which have been separated so as to have different radii according to their mass to charge ratios may, in one embodiment, be detected directly within the chamber 1 rather than being extracted and detected outside the chamber 1. The ions may be detected within the chamber 1 by a variety of means as further detailed below.

The ions may, for example, be illuminated with radiation such as UV radiation and their presence detected by absorption of a particular frequency or by secondary radiation of a particular frequency. Such a detection system is commonly used with High Pressure Liquid Chromatography ("HPLC") systems. This approach may also be used for analysis and detection of large bio-molecules such as molecules of DNA or proteins which have been tagged with fluorescent labels.

The ions may alternatively be illuminated with a narrow coherent collimated beam of light such as from a laser and their presence detected by detection of scattered light. This type of detection system is also commonly used with HPLC systems.

The ions could, in an alternative embodiment, be caused to oscillate by, for example, superimposing a high frequency electrical AC voltage to the DC voltage applied across the chamber 1 or by the application of a high frequency pressure wave or ultrasonic wave. An electrical sensor such as a capacitance-coupled transducer or an inductively coupled transducer may be used to detect the presence of oscillating ions. Alternatively, a pressure transducer may be used to measure the pressure wave caused by the oscillating charged particles.

The ions may be directly detected on the outer wall 4 of the chamber by progressively reducing the applied potential difference and allowing the ions to strike that wall 4. Ions may also be directly detected on the inner shaft 2 by progressively increasing the applied voltage. In a further embodiment, ions may be detected on a third electrode such as a thin wire placed in the chamber between the outer wall and the inner shaft.

Figure 2:
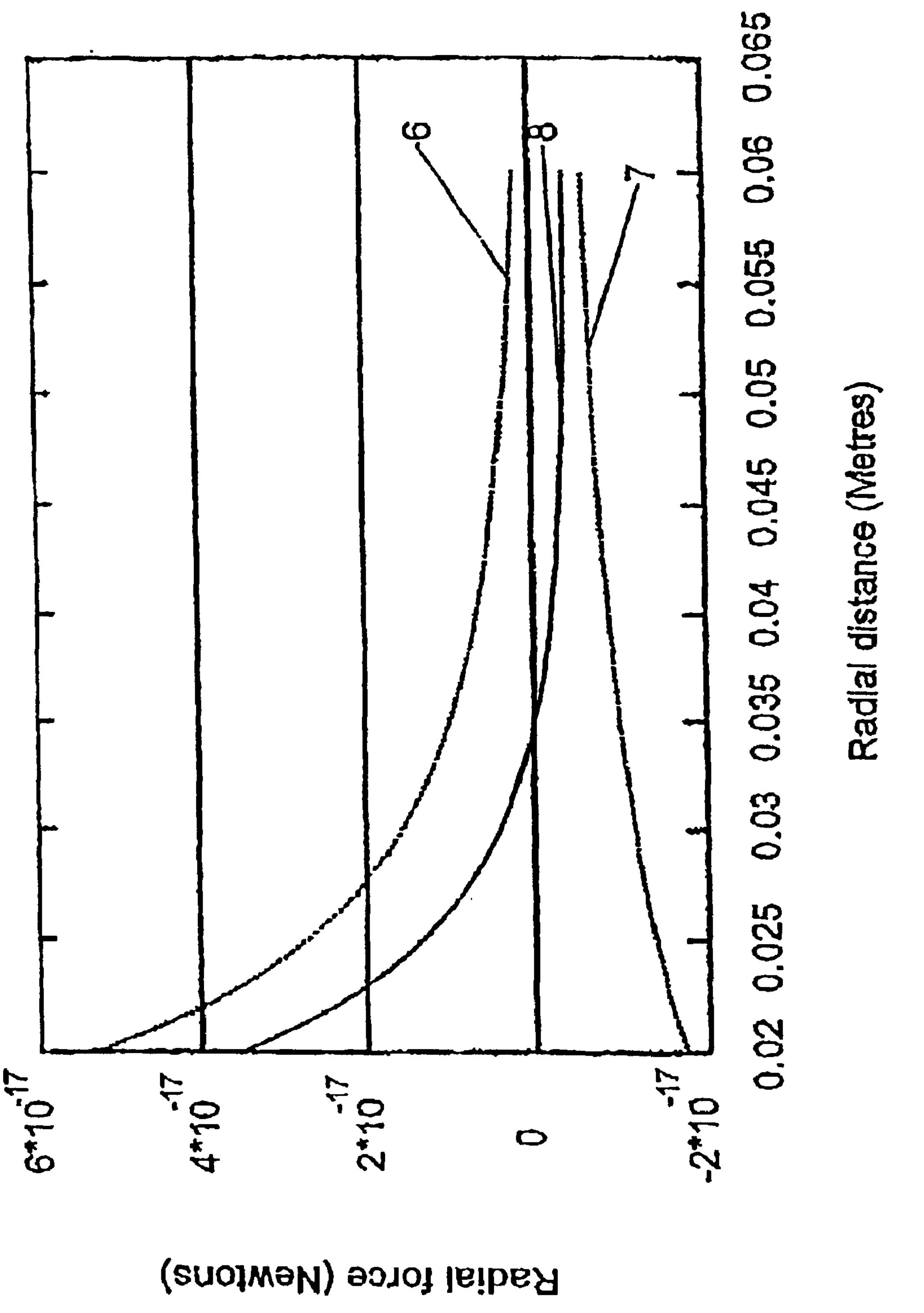
FIG. 2 is a graph illustrating the forces acting upon an ion in a vortex mass filter/analyser.

FIG. 2 illustrates the various forces acting on ions within the chamber 1 as a function of radial distance for the following values: $r_1$ (m)=0.02, $r_2$ (m)=0.2, shaft rotation frequency (Hz) $f_1$=2000, shaft voltage (V) V=5, mass of particle (atomic mass units)=10000, mass of particle (kg) $m=10000\times1.67\times10^{-27}$, and number of charges z=1. The overall net force 8 results from the combination of the centrifugal force 6 and the opposed electric force 7. As can be seen from the graph, at a particular radial distance (e.g. r_ 0.035 m) the overall net force on a singly charged ion having a mass of 10000 atomic mass units is zero.

Figure 3:
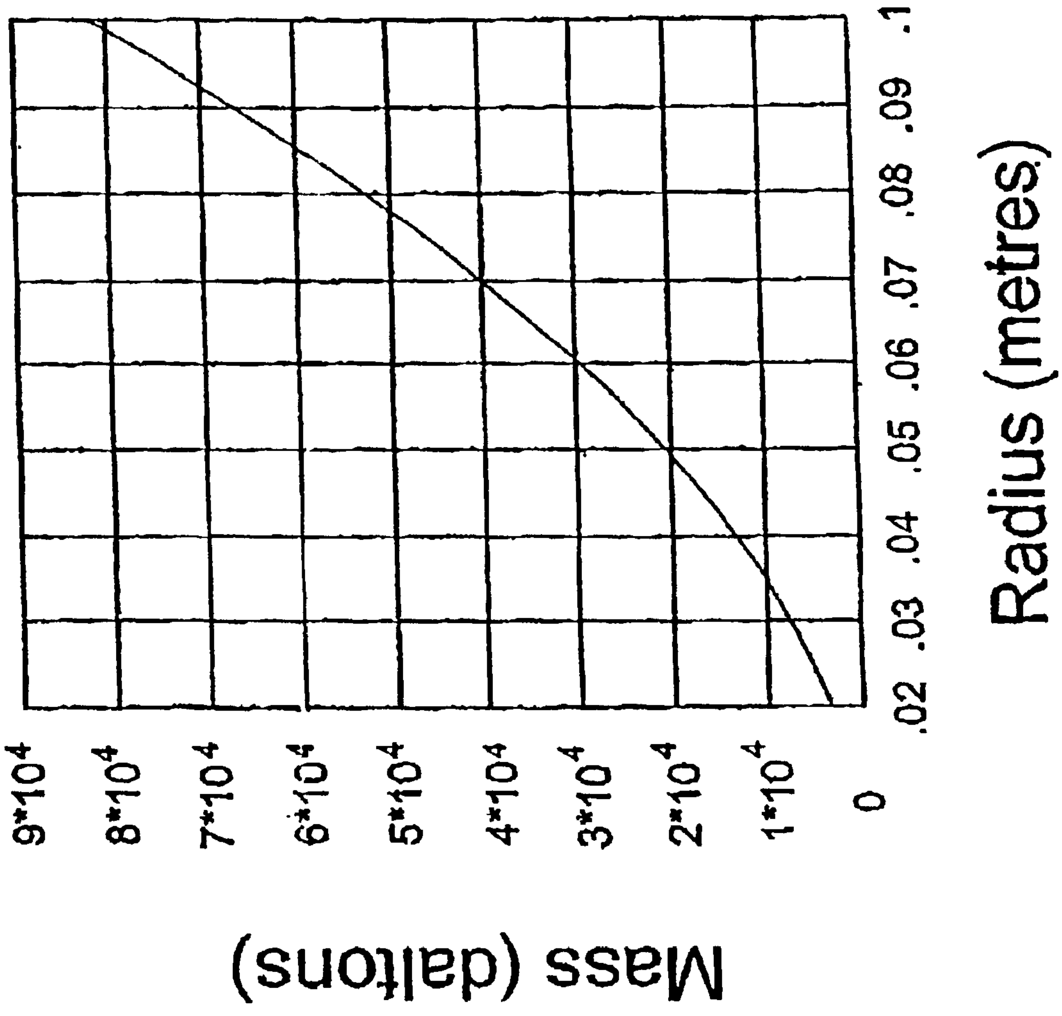
FIG. 3 shows how the mass to charge ratio of ions maintained in a stable equilibrium varies with radial distance.

FIG. 3 shows how the mass to charge ratio of ions maintained in stable equilibrium varies with respect to radial distance assuming that the shaft radius (m) $r_1$=0.02, outer cylinder radius (m) $r_2$=0.2, shaft rotation frequency (Hz) $f_1$=2000, and shaft voltage (V) V=5. As can be seen, for these particular parameters, ions having relatively high mass to charge ratios have stable orbits within the mass analyser.

Figure 4:
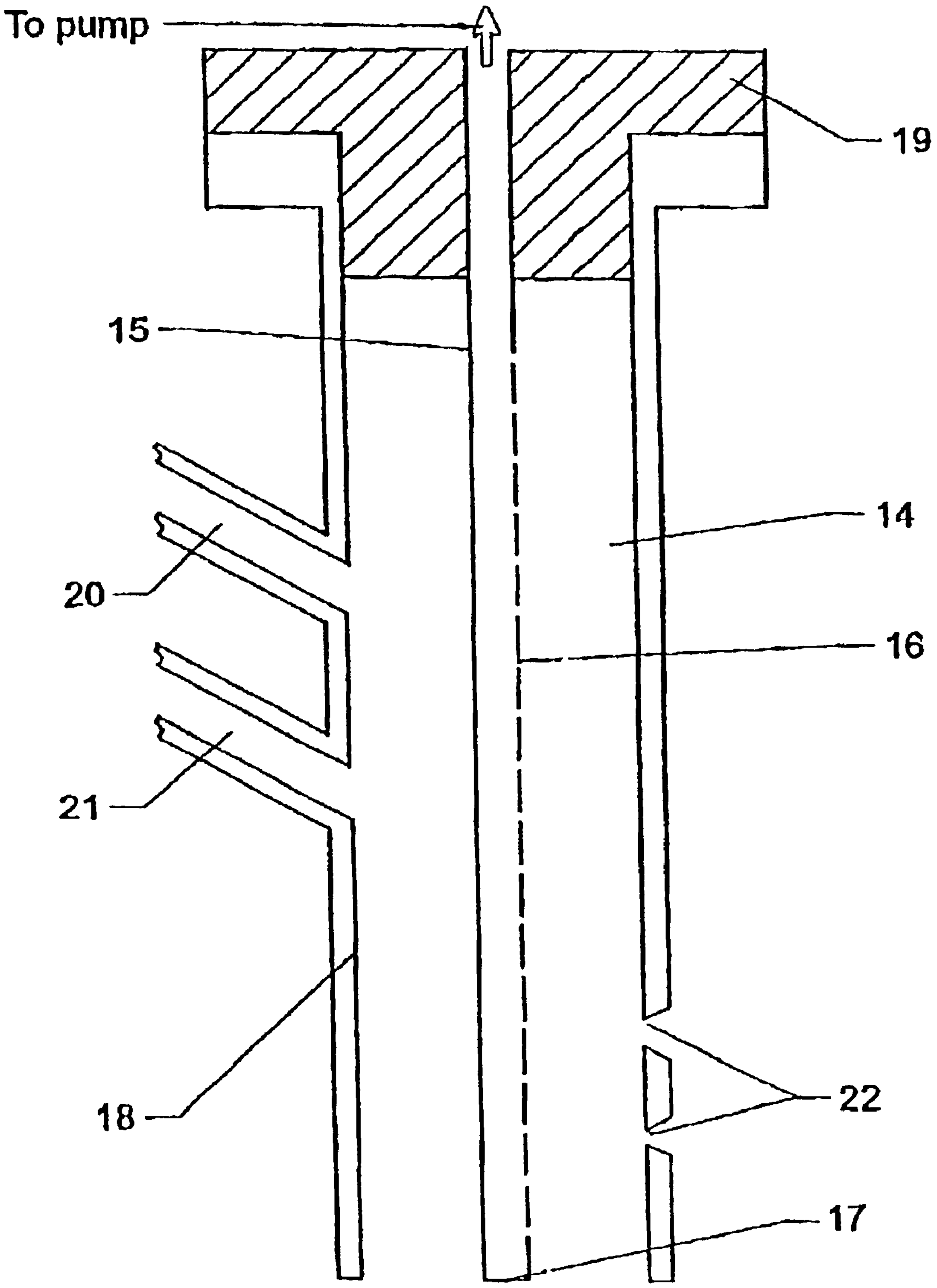
FIG. 4 shows another preferred vortex mass filter/analyser.

FIG. 4 shows another preferred vortex mass filter/analyser comprising a chamber 14, at the centre of which is a hollow central shaft 15. The hollow central shaft 15 has holes 16 in it along its length. One end of the central shaft 15 has a pump attached to it in order to allow fluid to flow from the chamber 14 into the hollow central shaft 15. The other end of the shaft 15 is preferably blanked off 17 or alternatively connected to another or the same pump (not shown). The pumping effect from the hollow central shaft 15 coupled with its rotation creates a vortex within the chamber 14 which has the effect of forcing the heavier ions towards the outside of the chamber 14. As before, a radial electric force is created by the generation of an electric field between the wall of the chamber 18 and the central shaft 15 which urges the positive ions back towards the centre of the chamber 14. The top 19 of the chamber is preferably blanked off.

Two inlet holes 20, 21 may be provided through which a sample and drying gas are input into the chamber 14. The drying gas is preferably introduced via the upper inlet 20 and the sample is preferably introduced via the lower inlet 21, although in less preferred embodiments this may be reversed. As mentioned above, the centrifugal force due to the vortex and the electric force due to the potential difference are arranged to cancel one another out for a given mass to charge ratio at a given radius. By varying the magnitude of the electric force, ions having a desired mass to charge ratio can be arranged to be in equilibrium at a desired radius within the chamber 14. The ions can therefore be separated according to their mass to charge ratio and ions having the desired mass to charge ratio can be extracted via outlet holes 22 arranged in the 18 wall of the chamber 14. Additionally/alternatively, according to a more preferred embodiment, the ions may be extracted via one or more apertures or the like in an end plate (not shown) preferably located towards the bottom of the chamber 14 opposed to the plate 19 at the top of the chamber. Accordingly, ions may be extracted axially and/or radially from the chamber 14.

Figure 5:
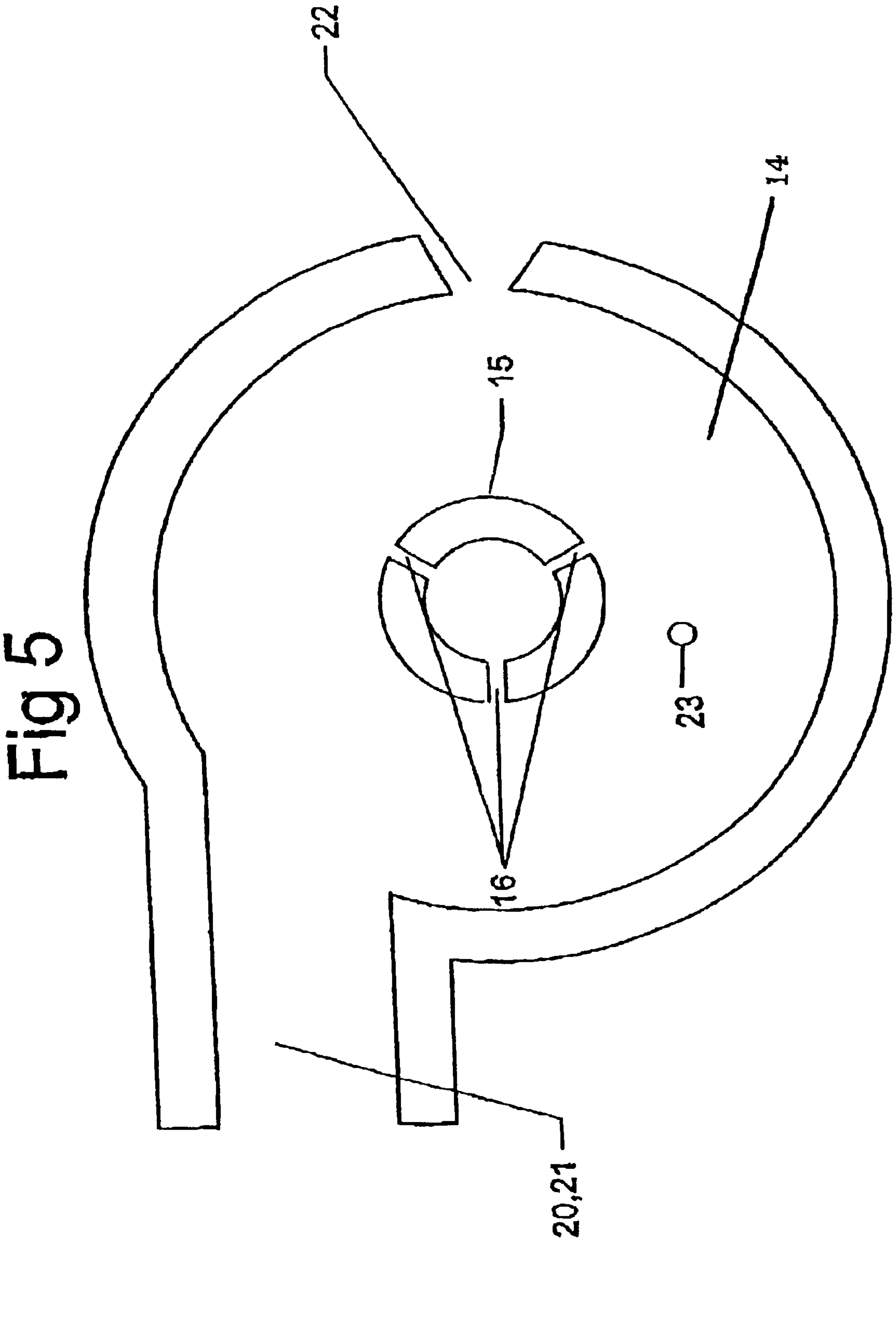
FIG. 5 is a plan view of FIG. 4.

FIG. 5 shows a plan view of FIG. 4. The chamber 14 is shown with inlets 20, 21 which inject the sample and drying gas in a generally tangential direction with respect to the centre of the chamber 14. Shaft or tube 15 has holes 16 arranged preferably at regular locations along its length. Preferably, three holes 16 are provided at each longitudinal location with the holes 16 being spaced evenly about the circumference of the shaft 15. On the wall at the far side of the chamber 14 from the inlets 20, 21 are one or more fluid exits 22. An axial extraction port 23 is also shown.

The other preferred features described above in relation to the embodiment shown in FIG. 1 can apply equally to the embodiment shown and described in relation to FIGS. 4 and 5.

As will be appreciated by those skilled in the art, the mass filter/analyser according to the preferred embodiment requires both a centrifugal force and an electric force to be acting upon ions within the mass filter/analyser. The centrifugal force on an ion is due to the viscous drag of gas molecules which are circulating. In a high vacuum ions would not effectively collide with gas molecules and hence the centrifugal force due to viscous drag on the ions would be negligible. As a result, the only force acting upon the ions would be an electric force due to the electric field. Without the electric field the ions would travel in a straight line. Accordingly, it is apparent that the gas pressure must be such that there are at least some collisions between the ions and the gas molecules in order for viscous drag to occur and hence a centrifugal force to be generated. As has been shown above, for a vortex mass filter/analyser in stable equilibrium the mass to charge ratio m/z is proportional to the square of the radius (r). Hence, by differentiating, the mass resolution (m/z)/Δ(m/z) can be obtained:

$$(m/z)/\Delta(m/z)=0.5r/\Delta r$$

where r is the radius at which stable equilibrium occurs and Δr is a measure of the deviation from this radius which can be tolerated.

Accordingly, for a mass resolution (m/z)/Δ(m/z) of 500:1 and a radius of 6 cm then Δr=0.006 cm. Similarly, for a mass resolution (m/z)/Δ(m/z) of 500:1 and a radius of 3 cm then Δr=0.003 cm. To a first approximation, the mean free path of air molecules at a pressure of 1 mbar is approximately 0.006 cm and at a pressure of 10 mbar it is approximately 0.0006 cm. Accordingly, since the mean free path should preferably not be significantly larger than the tolerance in the radius, and indeed should preferably be smaller, further preferably much smaller than the variation in the radial distance which may be tolerated, then the mass filter/analyser should preferably be operated at pressures greater than 1 mbar, preferably at least 10 mbar, and further preferably somewhere between 100 mbar and atmospheric pressure. Operation at pressures above atmospheric pressure is also contemplated.

For illustrative purposes only, the forces on an ion within a centrifuge with an applied radial electric field will now be considered. As will be shown, such an arrangement does not provide a stable equilibrium and hence such an arrangement is not intended to fall within the scope of the present invention.

The angular velocity ω (radians/sec) of a fluid in a centrifuge is constant. The tangential velocity v of the fluid at a particular radius r given by:

$$v=r\omega$$

and hence is proportional to the radius r. The centrifugal force $F_c$ on a particle of mass m at radius r is given by:

$$F_c=mr\omega^2$$

and therefore is proportional to mr.

The combined force F on the particle with mass m and charge ze is given by:

$$F=mr\omega^2-ze.\Delta V/(r.\ln(r_2/r_1))$$

If, at radius $r=r_0$, the combined force F is zero, then the mass/charge ratio:

$$m/ze=\Delta V/(\omega^2.r_0^2.\ln(r_2/r_1)$$

If an ion of mass to charge ratio m/ze moves outwards to a greater distance than $r_0$ from the centre, then the centrifugal force (which is proportional to mr) will increase, and the electric force due to the electric field (which is proportional to ze/r) will decrease, and the resulting force will act to move the ion further away from the centre. Conversely, if an ion of mass to charge ratio m/ze moves inwards to a smaller distance than $r_0$ from the centre, the centrifugal force will decrease and the electric force will increase, and the resulting force will act to move the ion towards the centre. Hence, the point of equilibrium, at radius $r_0$, is an unstable equilibrium, and it is for this reason that such an arrangement is not intended to fall within the scope of the present invention.

In the various embodiments described above, the radial electric field has preferably been altered to vary the mass to charge ratio of ions being filtered/analysed by the device. However, according to less preferred embodiments, it is contemplated that the speed of rotation of the shaft could additionally/alternatively be varied. It is also conceivable that the radius of the shaft and/or radius of the chamber could be varied.

What is claimed is:

1. A mass spectrometer comprising a vortex mass filter/analyser, wherein said vortex mass filter/analyser includes a chamber having a sample inlet and a hollow rotatable shaft arranged within said chamber, an interior of said shaft being in fluid communication with said chamber, wherein the interior of said shaft is connected to a pressure reducing means so that in use a vortex is created within said chamber, and wherein in use a potential difference is maintained between a wall of the chamber and said shaft and wherein at least some ions within said chamber are arranged to be maintained in a stable equilibrium due to opposing effects of a centrifugal force and an electric force without being exposed to a magnetic force.

2. A mass spectrometer as claimed in claim 1, wherein said shaft comprises one or more holes.

3. A mass spectrometer as claimed in claim 1, wherein said pressure reducing means comprises a pump.

4. A mass spectrometer as claimed in claim 1, wherein said potential difference is capable of being varied so that particles having a certain mass to charge ratio are arranged to be in equilibrium at a desired radius in said chamber.

5. A mass spectrometer as claimed in claim 1, wherein said chamber further comprises an inlet for a drying gas.

6. A mass spectrometer as claimed in claim 5, wherein said inlet for a drying gas is arranged so as to substantially tangentially inject a drying gas into said chamber.

7. A mass spectrometer as claimed in claim 6, wherein said sample inlet is arranged so as to substantially tangentially inject a sample gas into said chamber.

8. A mass spectrometer as claimed in claim 5, wherein said sample inlet is arranged so as to substantially tangentially inject a sample gas into said chamber.

9. A mass spectrometer as claimed in claim 1, wherein said chamber comprises an axial outlet through which ions are extracted in use.

10. A mass spectrometer as claimed in claim 9, wherein ions having substantially similar mass to charge ratios are preferentially extracted from said chamber via said outlet.

11. A mass spectrometer as claimed in claim 1, wherein said chamber comprises a radial outlet through which ions are extracted in use.

12. A mass spectrometer as claimed in claim 11, wherein ions having substantially similar mass to charge ratios are preferentially extracted from said chamber via said outlet.

13. A mass spectrometer as claimed in claim 1, wherein said vortex mass filter/analyser has a mass to charge ratio resolution $(m/z)/\Delta(m/z)$ selected from the group consisting of: (i)≧2:1; (ii)≧5:1; (iii)≧10:1; (iv)≧20:1; (v)≧50:1; (vi)≧100:1; (vii)≧200:1; (viii)≧500:1; (ix)≧1000:1; (x)≧2000:1; and (xi)≧5000:1.

14. A mass spectrometer as claimed in claim 1, wherein said mass filter/analyser is arranged and adapted to be operated at a pressure selected from the group consisting of: (i)≧1 mbar; (ii)≧2 mbar; (iii)≧5 mbar; (iv)≧10 mbar; (v)≧20 mbar; (vi)≧50 mbar; (vii)≧100 mbar; (viii)≧150 mbar; (ix)≧200 mbar; (x)≧250 mbar; (xi)≧300 mbar; (xii)≧350 mbar; (xiii)≧400 mbar; (xiv)≧450 mbar; (xv)≧500 mbar; (xvi)≧550 mbar; (xvii)≧600 mbar; (xviii)≧650 mbar; (xix)≧700 mbar; (xx)≧750 mbar; (xxi)≧800 mbar; (xxii)≧850 mbar; (xxiii)≧900 mbar; (xxiv)≧950 mbar; (xxv)≧1000 mbar; (xxvi) approximately atmospheric pressure; and (xxvii) above atmospheric pressure.

15. A mass spectrometer as claimed claim 1, further comprising an atmospheric pressure ion source.

16. A mass spectrometer as claimed in claim 1, further comprising an ion source selected from the group consisting of: (i) an Atmospheric Pressure Chemical Ionisation ("APCI") ion source; (ii) an electrospray ion source; and (iii) a Matrix Assisted Laser Desorption Ionisation ("MALDI") ion source.

17. A mass spectrometer as claimed in claim 1, wherein said mass filter/analyser comprises a chamber and ions are generated in said chamber.

18. A mass spectrometer as claimed in claim 1, further comprising a mass analyser arranged downstream of said vortex mass filter/analyser, said mass analyser being selected from the group consisting of: (i) a vortex mass analyser; (ii) a quadrupole mass analyser; (iii) a magnetic sector mass analyser; (iv) an ion trap; and (v) a Time of Flight mass analyser.

19. A mass spectrometer as claimed in claim 1, further comprising a hollow shaft arranged within a chamber, wherein said chamber is arranged to be maintained at a pressure ≧10%, 20%, 30%, 40%, 50%, 60%, 70%, 80%, 90% or 100% above atmospheric pressure (1013 mbar) whilst said shaft is arranged to be maintained at a pressure of 1013 mbar ±5% or at a pressure below atmospheric pressure.

* * * * *